Figure 1:
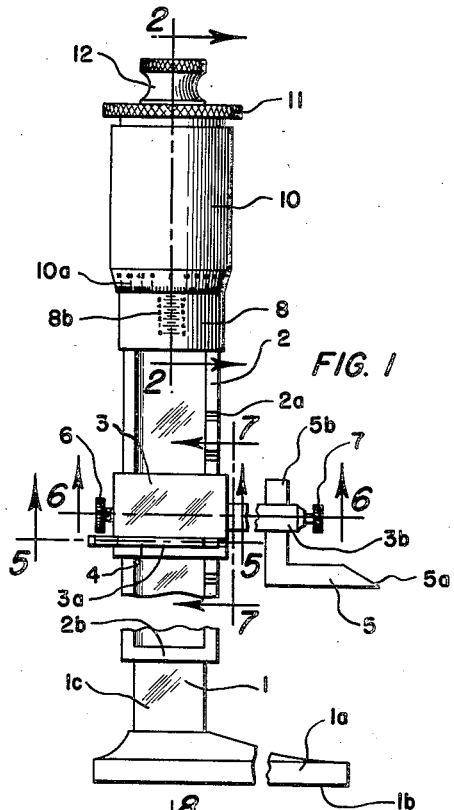

Jan. 1, 1952     H. F. WALLEN     2,580,865

PRECISION MEASURING INSTRUMENT

Filed Aug. 5, 1947     2 SHEETS—SHEET 1

INVENTOR.
HORACE F. WALLEN
BY
*Wm. H. Dean*
AGENT

Jan. 1, 1952                    H. F. WALLEN                    2,580,865
                        PRECISION MEASURING INSTRUMENT
Filed Aug. 5, 1947
                                                           2 SHEETS—SHEET 2

INVENTOR.
                                        HORACE F. WALLEN
                                            BY
                                            Wm. H. Dean
                                                    AGENT Patented Jan. 1, 1952

2,580,865

UNITED STATES PATENT OFFICE 2,580,865

PRECISION MEASURING INSTRUMENT

Horace F. Wallen, San Diego, Calif.

Application August 5, 1947, Serial No. 766,224

6 Claims. (Cl. 33—169)

My invention relates to precision measuring instruments, and more particularly to instruments for measuring heights above or below a reference plane or relative to a reference point or line lying in a plane.

Heretofore, measuring instruments of this class have been based on the principle of maintaining a fixed relationship for each numerical reading between a base plane, surface, line or point, and the measuring scribe, surface or point, and all adjustment in such instruments has been solely for the purpose of correcting back to this fixed relationship. Hence, in using these instruments a basic first dimension must be added to or subtracted from each subsequent measurement in a given layout.

Since mathematical calculation is an important source of error in layout, the purpose of this invention is to provide an instrument which will give direct readings from a first basic line or point to subsequent lines or points, and/or to give direct readings progressively from point to point, thus reducing errors and layout time to a minimum.

The objects of my invention are:

First, to provide an instrument of great flexibility without sacrificing accuracy;

Second, to provide a coarse adjustment and a micrometer adjustment which will quickly and accurately bring the measuring member of the instrument to any base line or point, and a revoluble and longitudinal reset allowing the instrument to be cleared to read zero at any such base line;

Third, to provide a precision instrument with a micrometer that is easily read without eyestrain;

Fourth, to provide an improved instrument whose main members are of such great length relative to the gap allowing for such movement as to allow no introduction of error due to fit or wear;

Fifth, to provide an instrument of this class having a scribe holding slide movable thereon incorporating precise indexing latch means for each inch of travel and also means for resetting the slide at intermediate points between the inch settings as desired;

Sixth, to provide an instrument of this class having a pedestal provided with a base portion and a bar slidable on said pedestal carrying a scribe holding slide thereon whereby the bar is movable longitudinally of the pedestal by means of a barrel micrometer and a slide indexed in positions an inch apart on said bar providing an extremely flexible and accurate tool which is quickly set up to measure various dimensions;

Seventh, to provide an instrument of this class having very simple and quickly operated micrometer resetting means;

Eighth, to provide an instrument of this class having a bar provided with equally spaced notched portions therein and a latch member on the slide for positively indexing said slide on said bar in said notch portions;

Ninth, to provide an instrument of this class having a barrel micrometer which neatly interconnects a flat bar and a channel-shaped bar reciprocally associated with each other for attaining longitudinally adjusted position one with the other; and Tenth, to provide a precision measuring instrument of this class which is very simple and economical of construction, efficient in operation and which will not readily deteriorate or get out of order.

Figure 2:
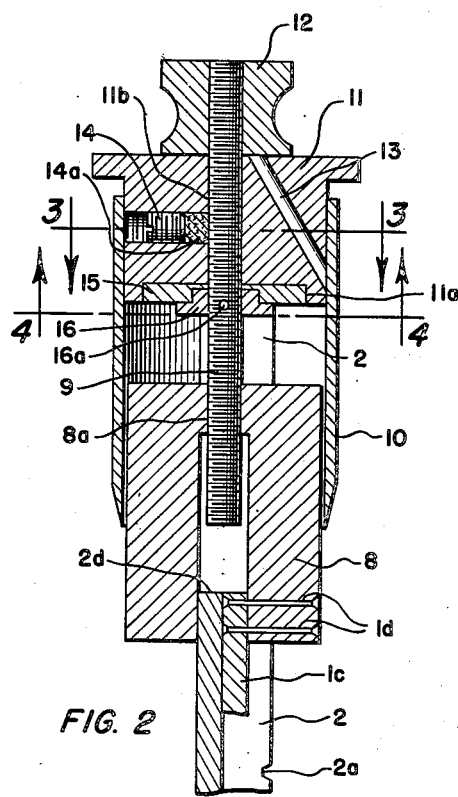
Figure 4:
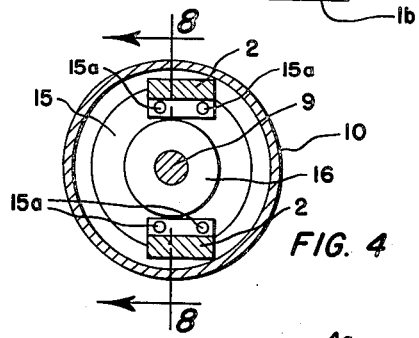
Figure 3:
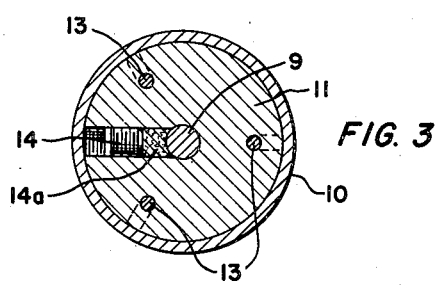
Figure 5:
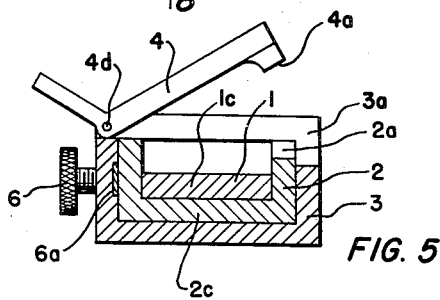
Figure 6:
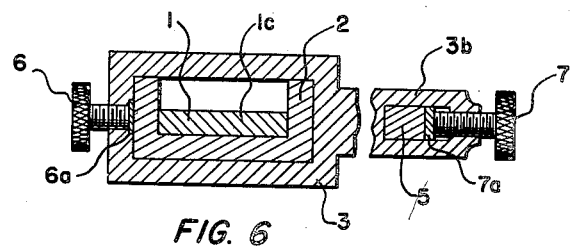
Figure 7:
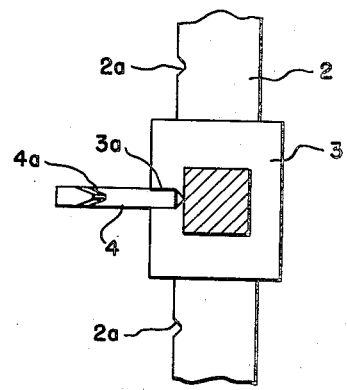
Figure 8:
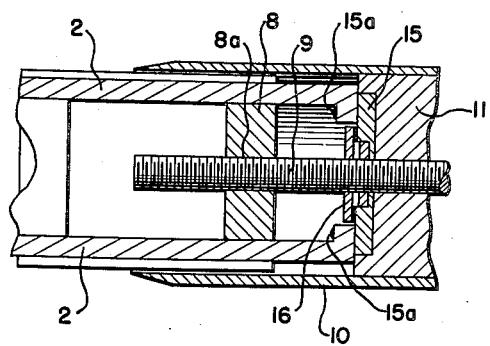

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application in which:

Fig. 1 is a side elevational view of my precision measuring instrument showing portions thereof broken away to facilitate the illustration; Fig. 2 is an enlarged fragmentary sectional view taken from the line 2—2 of Fig. 1; Fig. 3 is a sectional view taken from the line 3—3 of Fig. 2; Fig. 4 is a sectional view taken from the line 4—4 of Fig. 2; Fig. 5 is an enlarged sectional view taken from the line 5—5 of Fig. 1 showing a part thereof in varied position; Fig. 6 is an enlarged fragmentary sectional view taken from the line 6—6 of Fig. 1; Fig. 7 is an enlarged fragmentary sectional view taken from the line 7—7 of Fig. 1 and Fig. 8 is an enlarged fragmentary sectional view taken from the line 8—8 of Fig. 4.

Similar characters of reference refer to similar parts and portions throughout the several views of the drawings.

The pedestal 1, bar 2, scribe holding slide 3, latch 4, scribe 5, clamp screws 6 and 7, micrometer nut 8, micrometer screw 9, micrometer barrel 10, barrel head 11, resetting nut 12, barrel engaging pin 13, tolerance fixing screw 14 and the bearing plates 15 and 16 constitute the principal parts and portions of my precision measuring instrument.

The pedestal 1, as shown in Fig. 1 of the drawings, is provided with a flat base 1a having a precisely finished lower surface 1b adapted to rest on a surface plate or the like. This pedestal 1 is provided with an upwardly extending substantially rectangular in cross section bar portion 1c secured at its upper end by means of the pins 1d to the micrometer nut 8. This micrometer nut 8 is provided with an internally screw threaded portion 8a arranged in screw threaded relationship with the micrometer screw 9. The outer side of the micrometer nut 8 is provided with a graduated scale 8b arranged to cooperate with the annular scale 10a at the skirt of the barrel 10. The bar portion 1c of the pedestal 1 is slidably mounted in the channel-shaped in cross section bar 2. This bar 2 in one of the channel legs thereof is provided with angular notch portions 2a spaced precisely one inch apart. It will be noted that these notch portions 2a may be ½ inch apart or a greater distance if desired. The lower end of the channel-shaped in cross section bar 2 is provided with a bridge portion 2b extending from one leg to the other of said channel-shaped in cross section bar 2 which engages the opposite side of the bar portion 1c of the pedestal 1 from the web 2c of the channel-shaped in cross section bar 2. The opposite end of the bar 2 is connected to the bearing plate 15 and the web portion 2c of the bar 2 is relieved at 2d near the upper end of the bar portion 1c of the pedestal 1. The legs of the channel-shaped in cross section bar 2 are connected at their upper ends to said bearing plate 15 by means of the rivets 15a. The bearing plate 15 is engaged by the bearing plate 16 fixed to the micrometer screw 9 by means of the pin 16a. The bearing plate 15 is nested in a seat portion 11a of the barrel head 11 and the micrometer screw 9 is screw threaded in the bore portion 11b of the barrel 11. The resetting nut 12 is screw threaded on the extending end of the micrometer screw 9 and abuts the barrel head 11 together with the ends of the barrel engaging pins 13 which are angularly and radially disposed having their opposite ends engaging the inside of the barrel 10 for holding the same in certain longitudinal disposition with respect to the axis of the micrometer nut 8. The tolerance fixing screw 14 is screw threaded in the barrel head 11 and is provided with packing 14a engaging the threads of the micrometer screw 9. The slide 3 is a box-shaped structure open at opposite ends and is provided with a slotted portion 3a in which the latch 4 is pivotally mounted by means of the pin 4d. The slotted portion 3a, as shown in Fig. 5 of the drawings, extends to a depth below the notch portions 2a in the bar 2. The scribe holding slide 3 is provided with a clamp screw 6 adjacent to which a small gib 6a is provided bearing on the outer side of the bar 2 and this clamp screw 6 secures the scribe holding slide 3 in position on the bar 2 as desired. The scribe holding slide 3 is provided with an extending scribe holder arm portion 3b through which the scribe 5 extends longitudinally parallel to the bar 2 so that the point 5a of the scribe 5 is movable longitudinally of the bar 2. The clamp screw 7 is arranged to hold the scribe 5 in fixed position when tightened and engaging the inner end of this clamp screw 7 is a gib 7a bearing on the scribe 5 which is substantially L-shaped as shown in Fig. 1 of the drawings.

The operation of my precision measuring instrument is substantially as follows:

The bar 2 is supported in connection with the pedestal 1 by the micrometer screw 9 in revolubly longitudinally fixed relationship with the bar 2 and the nut 8 connected to the pedestal 1 so that rotation of the barrel 10 and head 11 together with the resetting nut 12 causes the micrometer screw 9 to move longitudinally in its screw threaded relation with the nut 8 reciprocally adjusting the pedestal bar portion 1c with the bar 2. Thus the scribe 5 is vertically movable with respect to the lower surface 1b of the base 1 in thousandths of an inch and the barrel 10 is provided with an annular scale 10a cooperating with the vertical scale 8b of the micrometer nut 8. This scribe holding slide 3 is reciprocally movable on the bar 2 and the latch 4 pivotally mounted in connection therewith is provided with a point portion 4a substantially wedge-shaped adapted to engage the wedge-shaped notch portions 2a in the bar 2 for precisely setting the slide at certain positions longitudinally spaced on the bar 2 preferably exactly one inch apart. Having been positioned by means of the latch 4, the clamp screw 6 is tightened fixing the slide 3 on the bar 2. In resetting the scribe 5, the clamp screw 7 is loosened. The portion 5b of the scribe 5 disposed parallel to the axis of the slide 3 is moved in the arm portion 3b of said slide 3 and is fixed in the desired position by means of the clamp screw 7. In resetting the micrometer scale on the barrel 10 and micrometer nut 8, the resetting nut 12 is loosened relieiving compressive engagement of the pins 13 on the inner side of the barrel 10 whereby it may be longitudinally and revolubly adjusted on the barrel head 11 secured to the micrometer screw 9. It will be noted that this barrel head 11 is provided with a bearing plate 15 fixed to the ends of the bar 2 and that the bearing plate 16 fixed to the micrometer screw 9 is revoluble therewith permitting micrometer barrel 10 and barrel head 11 to rotate about the end of the bar 2.

The tolerance fixing screw 14 is arranged to fix the longitudinally adjusted relationship of the micrometer screw 10 in the barrel head 11 so that the adjusted tolerance of the bearing plates 15 and 16 may be set very closely and maintained by the cushion element 14a inwardly of the set screw 14 which bears on the micrometer screw 9.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a measuring instrument of the class described the combination of a first bar, a scribe holding slide on and moveably longitudinally of said first bar, means for fixing said slide in certain positions on said first bar and a substantially L-shaped scribe in connection with said scribe holding slide adjustable in a direction parallel to the axis of said first bar on which said slide is moveably positioned, said first bar having equally spaced notched portions therein, said slide having a latch in connection therewith engageable with said notched portions for indexing said slide in certain positions on said first bar, a pedestal having a second bar portion adjacent said first bar overlapping the same and said bars longitudinally adjustable relatively to each other, a micrometer nut connected to said second bar and a micrometer screw connected to said first bar in mesh with said micrometer nut and axially fixed relative to said first bar.

2. In a measuring instrument of the class described the combination of a first bar, a scribe holding slide on and moveably longitudinally of said first bar, means for fixing said slide in certain positions on said first bar and a substantially L-shaped scribe in connection with said scribe holding slide adjustable in a direction parallel to the axis of said first bar on which said slide is moveably positioned, said first bar having equally spaced notched portions therein, said slide having a latch in connection therewith engageable with said notched portions for indexing said slide in certain positions on said first bar, a pedestal having a second bar portion adjacent said first bar overlapping the same and said bars longitudinally adjustable relatively to each other, a micrometer nut connected to said second bar and a micrometer screw connected to said first bar in mesh with said micrometer nut and axially fixed relative to said first bar, said nut provided with a scale thereon and a barrel in connection with said screw cooperating with said scale and provided with an annular scale on said barrel and means for resetting said barrel revolubly and longitudinally of said nut.

3. In a measuring instrument of the class described the combination of a pair of adjacent parallel bars longitudinally movable relatively to each other, a nut connected to one of said bars having an internally screw threaded portion, a micrometer screw in connection with the other of said bars in mesh with said micrometer nut and axially fixed relative to said other bar, a barrel head connected to said micrometer screw, a barrel surrounding said barrel head freely revoluble and longitudinally moveable thereon, a plurality of pins having inner ends extending through said barrel head outwardly to the interior of said barrel, a nut on said micrometer screw engaging the inner ends of said pins and arranged to force the same outwardly into engagement with said barrel for fixing the same on said barrel head.

4. In a resetting means for micrometers the combination of a hollow cylindrical micrometer barrel, a head for said barrel closely fitting the interior thereof, pins reciprocally mounted in said head engageable with the inner side of said barrel and a screw threaded member having a portion engaging said pins for forcing the pins outwardly into engagement with said barrel fixing the same revolubly and reciprocally on said head.

5. In a resetting means for micrometers the combination of a hollow cylindrical micrometer barrel, a head for said barrel closely fitting the interior thereof, pins reciprocally mounted in said head engageable with the inner side of said barrel and a screw threaded member having a portion engaging said pins for forcing the pins outwardly into engagement with said barrel fixing the same revolubly and reciprocally on said head, a micrometer screw extending through said barrel head and in screw threaded relationship therewith, a bearing plate in connection with said head, a bearing plate in connection with said screw contiguous therewith, a micrometer nut screw threaded on said micrometer screw, a bar connected with said micrometer nut screw threaded on said micrometer screw and a second bar in connection with said bearing plate adjacent said micrometer head.

6. In a resetting means for micrometers the combination of a hollow cylindrical micrometer barrel, a head for said barrel internally thereof, pins reciprocally mounted in said head engageable with the inner side of said barrel and screw threaded means for forcing the pins outwardly into engagement with said barrel fixing the same revolubly and reciprocally on said head, a micrometer screw extending through said barrel head and in screw threaded relationship therewith, a bearing plate in connection with said head, a bearing plate in connection with said screw contiguous therewith, a micrometer nut screw threaded on said micrometer screw, a bar connected with said micrometer nut screw threaded on said micrometer screw and a second bar in connection with said bearing plate adjacent said micrometer head, one of said bars being channel shaped and the other said bar reciprocally moveable between the legs of said channel shaped in cross section bar.

HORACE F. WALLEN.

REFERENCES CITED

The following references are of record in the file of this patent:

UNITED STATES PATENTS

| Number | Name | Date |
| --- | --- | --- |
| 350,513 | Washburn | Oct. 12, 1886 |
| 381,937 | Linsley et al. | May 1, 1888 |
| 433,311 | Starrett | July 29, 1890 |
| 487,410 | Sylvia | Dec. 6, 1892 |
| 552,659 | Brown | Jan. 7, 1896 |
| 924,668 | Jaques | June 15, 1909 |
| 1,547,668 | Poltin | July 28, 1925 |
| 2,225,500 | Kelsey | Dec. 17, 1940 |
| 2,382,759 | Weiss et al. | Aug. 14, 1945 |
| 2,400,440 | Rudolph | May 14, 1946 |
| 2,421,310 | Berlincourt | May 27, 1947 |
| 2,426,933 | Jarosz | Sept. 2, 1947 |
| 2,434,633 | Amador | Jan. 20, 1948 |